United States Patent
Finger et al.

(10) Patent No.: US 6,536,214 B2
(45) Date of Patent: Mar. 25, 2003

(54) EXHAUST GAS TURBOCHARGER FOR AN INTERNAL COMBUSTION ENGINE

(75) Inventors: Helmut Finger, Leinfelden-Echterdingen (DE); Peter Fledersbacher, Stuttgart (DE); Siegfried Sumser, Stuttgart (DE); Friedrich Wirbeleit, Esslingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/925,965

(22) Filed: Aug. 9, 2001

(65) Prior Publication Data

US 2002/0043066 A1 Apr. 18, 2002

Related U.S. Application Data

(63) Continuation-in-part of application No. PCT/EP00/00341, filed on Jan. 18, 2000.

(30) Foreign Application Priority Data

Feb. 11, 1999 (DE) ......................... 199 05 637

(51) Int. Cl.[7] ............................................. F02D 23/00
(52) U.S. Cl. ........................................................ 60/602
(58) Field of Search ........................ 60/602; 417/407; 415/160, 158, 116, 206, 205, 157

(56) References Cited

U.S. PATENT DOCUMENTS

| | | | | |
|---|---|---|---|---|
| 2,730,861 A | * | 1/1956 | Buchi | 415/205 |
| 3,270,495 A | | 9/1966 | Connor | 60/602 |
| 3,557,549 A | * | 1/1971 | Webster | 60/602 |
| 4,443,153 A | | 4/1984 | Dibelius | 60/602 |
| 4,499,731 A | | 2/1985 | Moser | |
| 4,544,326 A | * | 10/1985 | Nishiguchi et al. | 60/602 |
| 4,586,336 A | * | 5/1986 | Horler | 60/602 |
| 4,776,168 A | | 10/1988 | Woollenweber | 60/602 |
| 4,886,416 A | * | 12/1989 | Wunderlich | 60/602 |
| 4,894,990 A | * | 1/1990 | Tsubouchi | 60/602 |
| 5,092,126 A | * | 3/1992 | Yano | 60/602 |
| 5,454,225 A | * | 10/1995 | Sumser et al. | 60/602 |
| 5,758,500 A | | 6/1998 | Sumser | 60/602 |

FOREIGN PATENT DOCUMENTS

| | | | |
|---|---|---|---|
| DE | 43 03 521 C1 | 1/1994 | |
| DE | 43 03 520 C1 | 9/1994 | |
| FR | 2 649 756 A1 | * 1/1991 | 60/602 |

* cited by examiner

Primary Examiner—Thomas Denion
Assistant Examiner—Thai-Ba Trieu
(74) Attorney, Agent, or Firm—Klau J. Bach

(57) ABSTRACT

In an exhaust gas turbocharger for an internal combustion engine, in which a compressor is disposed in the intake duct and a turbine is disposed in the exhaust duct, and wherein the turbine has a turbine wheel in a turbine housing with at least one inlet flow passage for the introduction of exhaust gas which flow passage is provided with a variable turbine geometry for the variable setting of the effective turbine inlet flow passage cross-section, the variable turbine geometry being adjustable between a shut-off position that minimizes the turbine inlet flow cross-section and an open position that maximizes the turbine inlet flow cross-section, a gas-collecting chamber is provided which is in communication with the inlet flow passage in the turbine housing, the total volume of flow passage and the gas-collecting chamber being adjustable by an actuator movably disposed in the turbine housing as a function of the operating state of the internal combustion engine.

16 Claims, 4 Drawing Sheets

EXHAUST GAS TURBOCHARGER FOR AN INTERNAL COMBUSTION ENGINE

This is a continuation-in-part application of International Application PCT/EP00/00341 filed Jan. 18, 2000 and claiming the priority of German application 199 05 637.4 filed Feb. 11, 1999.

BACKGROUND OF THE INVENTION

The invention relates to an exhaust gas turbocharger for an internal combustion engine including a compressor in the intake duct and a turbine in the exhaust duct. The turbine includes a housing with a flow passage provided with a variable vane structure for controlling the exhaust gas flow into the turbine.

DE 43 30 487 C1 discloses an exhaust gas turbocharger having radial and semi-axial exhaust gas flow to the turbine wheel. A variable turbine geometry is provided in the form of a guide structure having variable guide vanes for the variable setting of the flow entry cross section of the turbine. By changing the flow entry cross section, varying levels of exhaust gas counter-pressures can be achieved in the section between the cylinders and the exhaust gas turbocharger, as a function of the operating state of the internal combustion engine. As a result, it is possible to control the output of the turbine and the output of the compressor as needed. In the powered operating mode, the efficiency of the exhaust gas turbocharger can be improved in this manner. In an engine braking operating mode, high engine braking performances can be achieved as the turbine geometry is converted to a shut-off position that reduces the flow cross-section into the turbine, so that the exhaust gas back pressure between cylinder outlet and turbine is increased and the piston has to perform compression work against the high excess pressure in the exhaust gas line during the compression strokes.

A comparable exhaust gas turbocharger is also disclosed in U.S. Pat No. 5,758,500.

Exhaust gas turbochargers are further known which have a double flow turbine housing, as for example those known from DE 195 40 060 A1, which have two flow passages, divided by a partition, for feeding the exhaust gas to the turbine wheel. The double-flow form of the turbine housing is advantageous for impulse charging of the exhaust gas turbocharger, in which the pressure wave formation, which is dependent on the ignition sequence of the individual cylinders, is utilized to increase the charger performance.

A double-flow turbine housing is also known from the document entitled "Lecture manuscript for the faculty of the internal combustion engines", Volume II, December 1985, Aachen Technical University, page 281.

Publication U.S. Pat. No. 4,449,731 shows an exhaust gas turbocharger into whose flow passage inserted an axially adjustable spring-loaded annular piston is disposed, whose position is adjusted to an equilibrium state between the spring force on the one hand and the exhaust gas back pressure on the other hand. The piston is a passive control element, whose position depends on external forces acting upon it. The volume of the flow passage, however, cannot be selectively set in the arrangement of U.S. Pat. No. 4,499,731, so that a selective switch over between impulse pressure charging and back pressure charging of the turbocharger cannot be performed. In addition, the flow conditions in the flow passage are changed as a result of a change in position of the control piston, which may result in a decline in performance in certain operating ranges of the internal combustion engine.

Publication DE 42 00 507 C2 discloses a variable leaf spring in the flow passage of a turbo machine. The position of the leaf spring is adjustable by an adjustment device. A change in position of the leaf spring changes the volume and the form of the flow passage. As a result, however, the flow conditions may also change in an undesirable manner.

By way of prior art, reference is further made to publications DE 197 27 140 C1 and EP 0 884 454 A1, which also relate to turbochargers.

It is the object of the present invention to improve further the utilization of the exhaust gas energy of an internal combustion engine having an exhaust gas turbocharger whose turbine has a variable turbine geometry.

SUMMARY OF THE INVENTION

In an exhaust gas turbocharger for an internal combustion engine, in which a compressor is disposed in the intake duct and a turbine is disposed in the exhaust duct, and wherein the turbine has a turbine wheel in a turbine housing with at least one inlet flow passage for the introduction of exhaust gas which flow passage is provided with a variable turbine geometry for the variable setting of the effective turbine inlet flow passage cross-section, the variable turbine geometry being adjustable between a shut-off position that minimizes the turbine inlet flow cross-section and an open position that maximizes the turbine inlet flow cross-section, a gas-collecting chamber is provided which is in communication with the inlet flow passage in the turbine housing, the total volume of flow passage and the gas-collecting chamber being adjustable by an actuator movably disposed in the turbine housing as a function of the operating state of the internal combustion engine.

The gas-collecting chamber of variable volume fulfills a balancing or compensating function, because the gas volume available within the turbine housing for the pressure transmission of the exhaust gas can be adjusted as necessary to the current situation. This makes it possible to create conditions that permit both impulse pressure charging and back-pressure charging of the exhaust gas turbocharger, both with high efficiency, as a result of which improved energy output is obtained over a wide operating range.

In the case of impulse pressure charging, where residual energy of the exhaust gas contained in the combustion chamber is abruptly transmitted to the turbine wheel when the outlet valves are opened, it is expedient for optimum effectiveness of pulse transmission, to keep the total volume in the turbine which is available for the transmission of the pulse as low as possible. For this purpose, the flow passage in the turbine housing is connected with the gas-collecting chamber of variable volume, the volume of which is reduced if boost pressure charging of the exhaust gas turbocharger is desired, so that the total volume within the turbine housing is likewise reduced and the conditions for the pulse transmission to the turbine wheel are advantageous.

In back-pressure charging, by contrast, the exhaust gases of all the cylinders are collected and fed to the turbine, ideally under approximately constant pressure, for which an enlarged total volume in the turbine housing is expedient. The equal application thus achieved results in more efficient performance of the turbine.

The enlargement of the total volume can be achieved by incorporating the gas-collecting chamber volume, the connecting aperture between flow passage and gas-collecting chamber merely being opened when desired but the two volumes otherwise being kept constant. According to another advantageous embodiment, the volume is changed by continuous enlargement of ht gas-collecting chamber volume, the gas-collecting chamber either being in permanent communication with the flow passage or being connected to the flow passage so as to be capable of being switched on and off.

Especially at low mass throughputs through the turbine, at which only a low exhaust gas back-pressure is built up, which would result in an energy output insufficient for impulse pressure charging, the volume of the gas-collecting chamber is reduced, so that impulse pressure charging (utilization of the exhaust gas pressure pulses) can be effectively used. At higher mass throughputs, however, with an enlarged volume, high exhaust gas back pressures with correspondingly high turbine performances can be achieved via impulse pressure charging.

According to an advantageous embodiment of the invention, the situation-dependent setting of the volume of the gas-collecting chamber is achieved via an actuator, which forms a component of the variable turbine geometry for the variable setting of the turbine wheel entry cross section. This actuator therefore has, in addition to the function of setting the cross-section geometry, that of adaptively setting the volume of the gas-collecting chamber or the total volume in the turbine housing. In this way, two functions can be performed with a single component and a simplification of design is achieved thereby. The actuator is disposed, relative to the gas-collecting chamber, so that at least one actuator positions exists in which the gas-collecting chamber is connected to the flow passage. It may be advisable here both to provide only one position of the actuator in which the gas-collecting chamber communicates with the flow passage, whereas it is otherwise isolated from the flow passage, and to permit a continuous or virtually continuous adjustment of the gas-collecting chamber volume as a function of the actuator position.

Preferably, a wall or a plurality of walls of the gas-collecting chamber are bound by the variable turbine geometry or the actuator of the turbine geometry, so that an adjustment of the turbine geometry automatically results in the enlargement or reduction of the gas-collecting chamber volume.

It is advantageous, in the case of a turbine that is provided with a radial and a semi-axial turbine wheel inlet cross section, to arranged the gas-collecting chamber adjacent to the radial turbine wheel inlet area, especially between the radial and the semi-axial turbine wheel inlet flow passages which provides for a space-saving design that can easily be produced. The actuator, preferably formed as an axially displaceable annular sleeve, is axially adjustable between a shut-off and an open position. The gas volume of the gas-collecting chamber and flow passage have a minimum value in the shut-off position. In the shut-off position, advantageously, the radial turbine wheel inlet cross-section is closed, so that the exhaust gas fed to the turbine can act on the turbine wheel only via the semi-axial turbine inlet flow passage. In the open position, by contrast, the turbine wheel is supplied with gas both via the semi-axial and via the radial turbine inlet flow passages. The shut-off position, which is associated with minimization of the gas-collecting chamber, is expediently provided for impulse pressure charging in which the internal combustion engine is operating, the open position however being provided for back-pressure charging.

Preferably, a plurality of separately formed flow passages are formed in the turbine housing, and lead to the semi-axial turbine wheel inlet area. They act upon the turbine wheel by segments, viewed over the circumference, as a result of which exhaust gas mixing between individual flow passages is prevented. In the open position of the variable turbine geometry, the flow passages communicate with the gas-collecting chamber, via which exhaust gas can be fed to the turbine wheel via the radial turbine wheel entry cross section.

In the shut-off position, by contrast, the volume of the gas-collecting chamber is reduced and the radial turbine wheel entry area is blocked or reduced to a minimum. The flow passages are separated from the gas-collecting chamber via a partition, including a connecting aperture. The cross-section of the connecting apertures can be enlarged or reduced by the actuator of the turbine geometry.

The invention will become more readily apparent from the following description of preferred embodiments on the basis of the accompanying drawings:

DESCRIPTION OF PREFERRED EMBODIMENTS

In the examples of embodiment shown in FIGS. 1 to 4a, identical components are provided with identical reference numbers.

Figure 1:
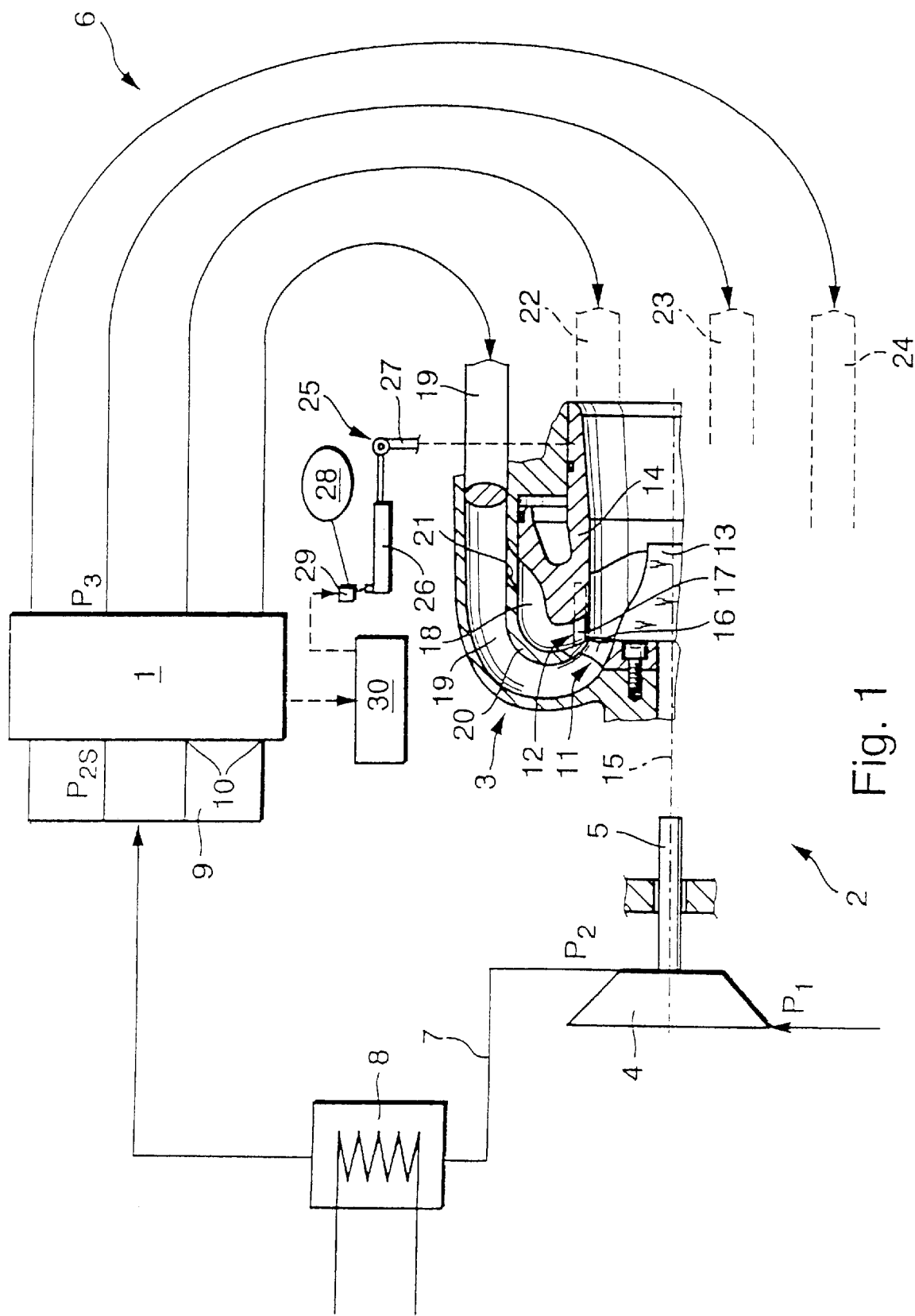
FIG. 1 shows a diagrammatic view of a charged internal combustion engine with an exhaust gas turbine according to the invention in a first embodiment.

The internal combustion engine 1 shown diagrammatically in FIG. 1, which may be, for example, the internal combustion engine of a passenger car or of a utility vehicle, has an exhaust gas turbocharger 2 with a turbine 3 in the exhaust gas duct 6 and a compressor 4 in the intake tract 7. The turbine 3 is provided with a variably controllable turbine geometry for the variable adjustment setting of an effective turbine cross-section. The turbine 3 is driven by the exhaust gases, which are under exhaust gas pressure $p_3$, in the exhaust gas duct between the cylinder outlet of the internal combustion engine and the turbine inlet. Downstream of the turbine 3, the depressurized exhaust gas is discharged to the atmosphere via a catalytic converter.

The turbine 3 drives, via a shaft 5, the compressor 4, which compresses the combustion air, which is admitted to the turbine under atmospheric pressure $p_1$, to an increased pressure $p_2$. The combustion air compressed in the compressor 4 is cooled in a charge air cooler 8 downstream of the compressor 4 and then fed, under the charge pressure $p_{2s}$, to the intake manifold of the internal combustion engine 1 for distribution to the cylinder inlets 10. The increased charge air pressure $p_{2s}$ results in an increase in the power output of the engine.

The turbine 3 has a semi-axial turbine wheel entry cross section 11 at the end of a flow passage 19 and a radial turbine wheel inlet 12. The exhaust gas enters the turbine via the entry cross sections 11, 12 and is guided onto the turbine wheel 13. In the region of the semi-axial turbine wheel inlet area 11 is a stationary, annular guide vane structure 16, whose vanes are optimized for a relatively small to average mass flow. In the region of the radial turbine wheel entry cross-section, there is a guide vane structure 17, again of annular form.

The variable turbine geometry arrangement comprises an actuator 14, which in the example of embodiment is formed as an axially displaceable annular sleeve and is adjustably movable co-axially with the longitudinal axis of the turbine between a shut-off position with a reduced turbine wheel inlet cross-section and an open position with an enlarged turbine wheel inlet cross-section. The actuator 14 exclusively controls the radial turbine wheel inlet cross-section 12, which is shut off or reduced to a minimum in the shut-off position and adopts a maximum value in the open position.

The position of the actuator 14 is adjusted with the aid of a pneumatic setting device 25, which comprises two setting levers 26, 27 that are actuated by means of a compressed air source 28. Interposed between the compressed air source 28 and the setting device 25 is a pneumatic valve 29, which can be opened and closed via a controller 30 as a function of the operating state of the internal combustion engine 1.

Instead of a pneumatic actuating system, an electrical or hydraulic actuating system is also possible.

According to another embodiment, the variable turbine geometry may also be provided by rotatable guide vanes in the guide vane structure instead of an axial slide. The cross-sectional adjustment is achieved in this case by rotating the vanes.

It may additionally be expedient to slide the actuator 14 so far to the open position that there is no longer any axial overlap between actuator 14, and exhaust gas by pass is made possible, to bypass the turbine wheel 13. This is assisted from the design standpoint by an axially short configuration of the turbine wheel 13.

As gas-collecting chamber is formed in the turbine housing annularly around the turbine wheel and is disposed radially between the flow passage 19 and the radial turbine wheel entry area 12. The gas-collecting chamber 18 is separated by a partition from the flow passage 19. The partition 20 has a connecting aperture 21 via which the exhaust gas from the flow passage 19 can flow into the gas-collecting chamber 18. On the radially inward side of the gas-collecting chamber 18 is the radial turbine wheel inlet area 12.

A wall of the gas-collecting chamber 18 is formed by the radially widened actuator 14 of the variable turbine geometry, so that the volume of the gas-collecting chamber 18 can be set variably as a function of the position of the actuator 14. In the open position of the actuator 14, the volume of the gas-collecting chamber 18 assumes a maximum value. Both the radial turbine wheel inlet cross-section 12 and the connecting aperture 21 are opened in the open position. In the shut-off position, the volume of the gas-collecting chamber 18 is zero or adopts a minimum value. The actuator 14 closes the radial turbine wheel entry cross-section 12 and the connecting aperture 21.

It may be expedient to keep the volume of the gas-collecting chamber constant independently of the position of the actuator of the variable turbine geometry and merely to adjust the cross-section of the communication aperture between the flow passage and the gas-collecting chamber as a function of the position of the actuator.

A total of four flow passages 19, 22, 23, 24 are provided, distributed over the circumference of the turbine 3. They are supplied with exhaust gas directly from the cylinder outlets of individual cylinders or cylinder groups of the internal combustion engine 1. Each passage leads to a semi-axial, segment-like turbine wheel inlet cross-section to the action of exhaust gas. The three further flow passages 22 to 24 are formed in a manner corresponding to the flow passage 19 and communicate in the open position of the actuator 14 via further connection apertures with the gas-collecting chamber 18. In the shut-off position, all the flow passages are shut off from the gas-collecting chamber 18 and only the segment of the semi-axial turbine wheel inlet area 11 assigned to the respective flow passage is subjected to the action of exhaust gas.

The variable turbine geometry of the turbine 3 may be used to increase efficiency in the engine-operating mode. With low exhaust gas mass flow—under light load and/or at low engine rpm—pulse pressure charging is used to drive the turbine 3. The actuator 14 of ht variable turbine geometry is moved into the shut-off position, in which the radial turbine wheel entry cross-section 12 and the cross-section of the connecting aperture 21 between flow passage 19, or the further flow passages 22 to 24, and gas-collecting chamber 18 is reduced or shut-off. The exhaust gas is fed to the turbine wheel primarily or exclusively via the semi-axial turbine wheel inlet cross-section 11 to the turbine wheel 13. At the same time, the total volume available for the pressure propagation in the turbine 3 is reduced, as a result of which the pressure pulse propagation during pressure pulse charging is improved.

At high exhaust gas flows—high load, high engine rpm—back pressure charging is preferentially used. The actuator 14 is moved into its open position, in which the passage aperture 21 and the radial turbine wheel inlet cross section 12 are opened and the volume of the gas-collecting chamber 18 is enlarged. As a result, exhaust gas flowing through the flow passages 19, 22, 23, 24 can also enter the annular gas-collecting chamber 18.

The number of flow passages may vary with the number of cylinders and as a function of the design of the internal combustion engine.

The exhaust gas turbocharger 2 may also be used in engine braking operation to provide for engine braking power. For this purpose, the actuator 14 of the turbine 3 is moved into the shut-off position, whereupon an increased exhaust gas back pressure $p_3$ is built up. The exhaust gas flows through the reduced entry cross section of the turbine, and strikes the turbine wheel 13 driving the compressor 4, at increased velocity. A high overpressure $p_2$ is built up in the intake tract 7, whereupon brake valves are opened at the cylinder outlet of the internal combustion engine 1, and air compressed in the cylinder is discharged through the brake valves against the exhaust gas back pressure $p_3$ built up in the exhaust gas line 6.

The braking performance can be influenced by the position of the variable turbine geometry and setting of the turbine wheel entry cross section resulting therefrom.

Figure 2:
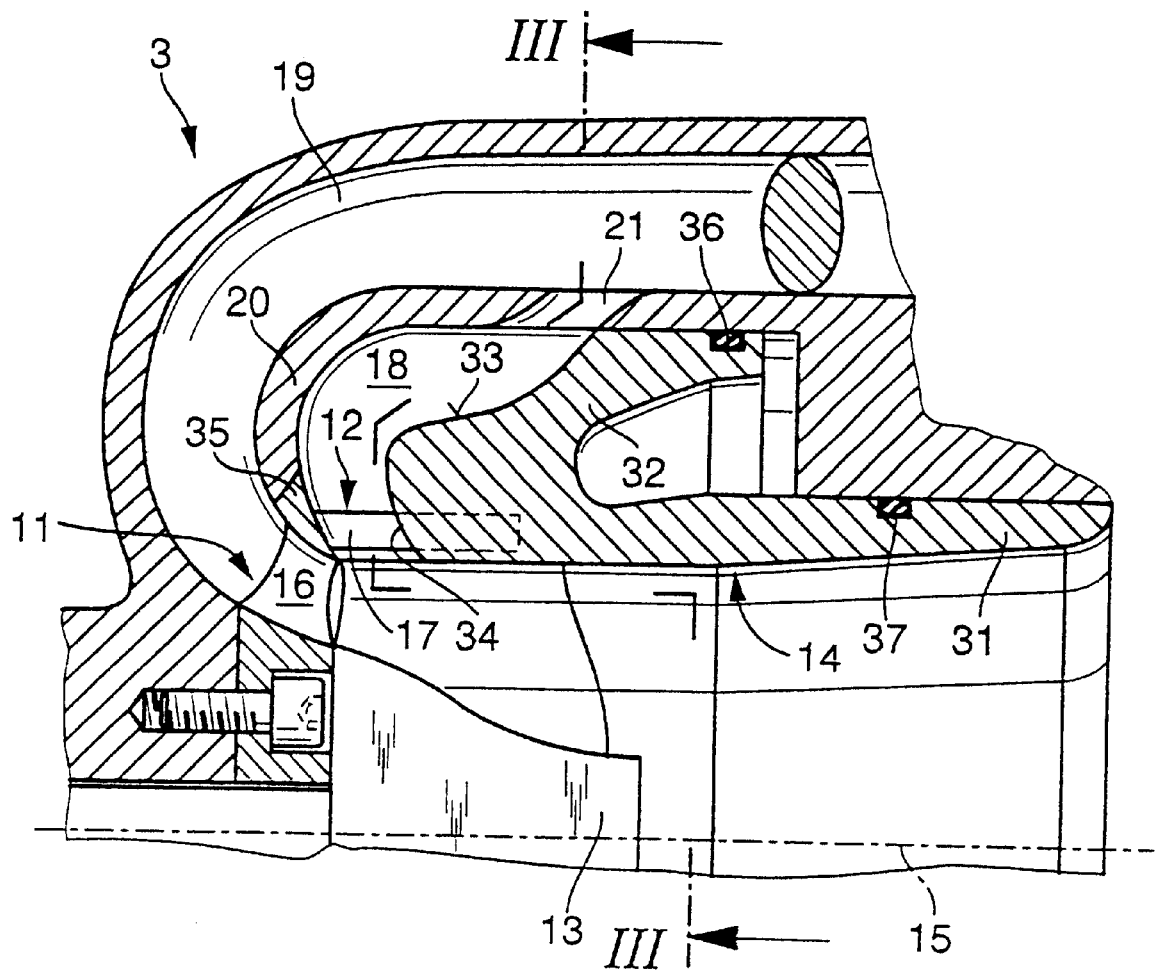
FIG. 2 is an enlarged view of the exhaust gas turbine shown in FIG. 1.

The sectional enlargement according to FIG. 2 shows that the actuator 14 of the variable turbine geometry forms a conical annular section 31 downstream of the turbine wheel 13, the diameter of which section 31 becomes larger with increasing axial distance from the turbine wheel 13. On the side facing the gas-collecting chamber 18, the actuator 14 has a radially widened section 32 that forms a wall 33 of the gas-collecting chamber. The wall 33 can also be adapted to the opposite contour of the partition 20, so that in the shut-off position of the actuator 14 the wall 33 lies directly against the opposite wall of the gas collection chamber 18 and the volume of the gas-collecting chamber 18 is reduced to zero. By means of axial adjustment of the actuator 14 and of the wall 33, the volume of the gas-collecting chamber 18 can be enlarged or reduced.

In the shut-off position of the actuator 14, the radially outer surface of the radially widened section 32 closes the communication aperture 21 between gas-collecting chamber 18 and flow passage 19 or the further flow passages, not shown in FIG. 2. In the shut-off position of the actuator 14, the inner surface of the actuator 14 closes the radial turbine wheel inlet flow passage 22. In the open position, both the communication aperture 21 and the turbine wheel inlet flow passage 12 are fully opened.

At the front end surface 34 of the actuator 14, a guide vane structure 17 is disposed in the area of the turbine inlet flow passage 12. The guide vane structure 17 is mounted on an annular support element 35. The actuator 14 has an opening into which the vane structure 17 can be completely introduced in the shut-off position of the actuator in order to permit flow-tight closure of the radial turbine wheel inlet flow passage 12. The support element 35 is mounted on the end surface of the partition 20 of the housing and simultaneously serves to secure the semi-axial guide vane structure 16 in the area of the semi-axial turbine wheel inlet flow passage 11.

The radial guide grill 17 may also be secured to the end surface of the actuator 14 and a reception opening may be provided on the separating element 35, into which the guide vane structure 17 is inserted when the actuator 14 is moved to the shut-off position.

The actuator 14 is sealed against the turbine housing by two sealing rings 36, 37.

Figure 3:
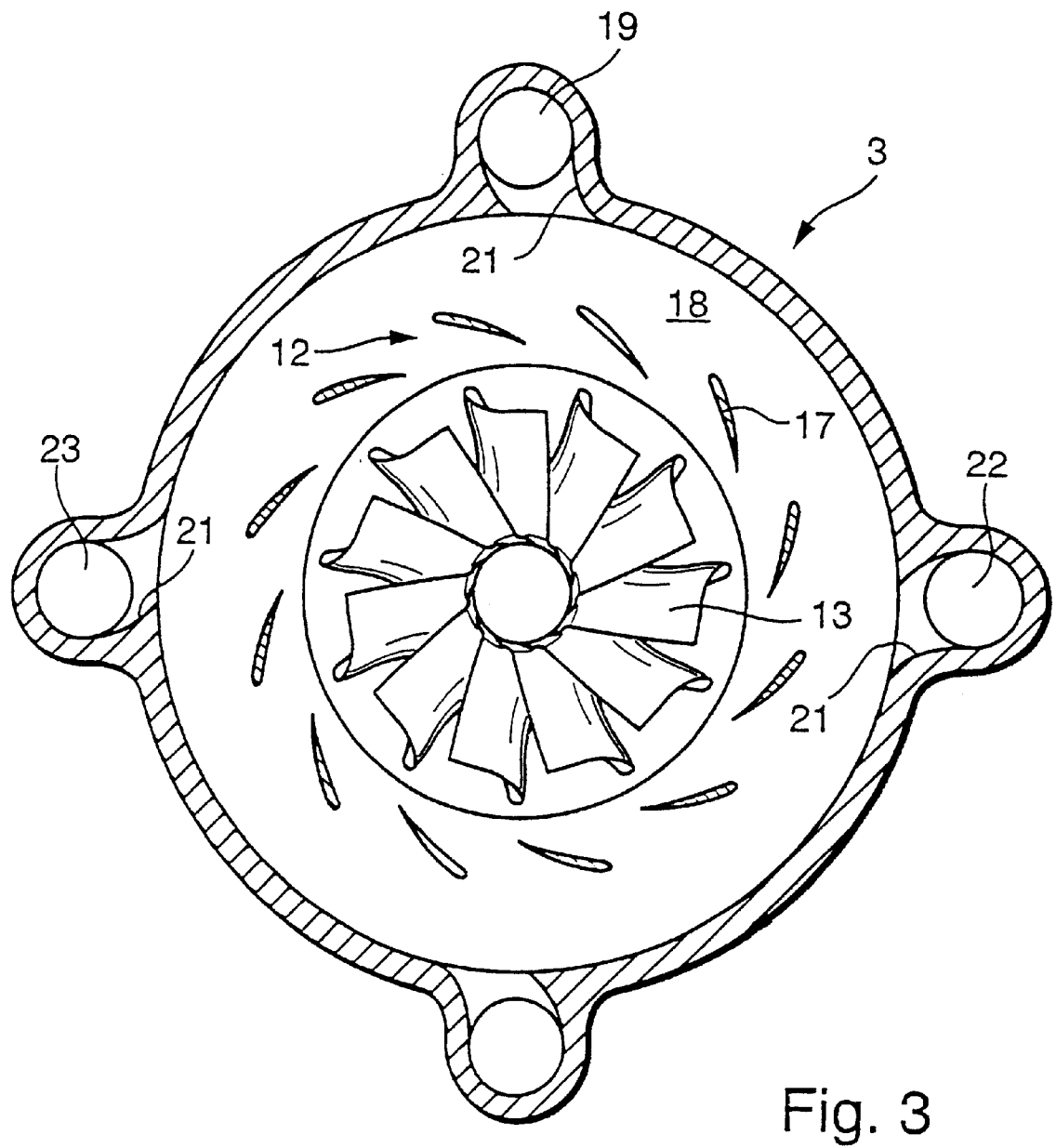
FIG. 3 is a cross-sectional view taken along line III—III of FIG. 2.

The sectional view of FIG. 3 shows that the communication apertures 21 have the shape of control slits, contoured favorably for flow purposes, so that when the communication apertures 21 are unblocked, the exhaust gas flowing from the flow passages 19, 22, 23 into the gas-collecting chamber 18 undergoes a spinning motion that guides the exhaust gas in the gas-collecting chamber 18 on an annular path. As a result, the exhaust gas distribution in the annular gas-collecting chamber 18 is improved.

Figure 4:
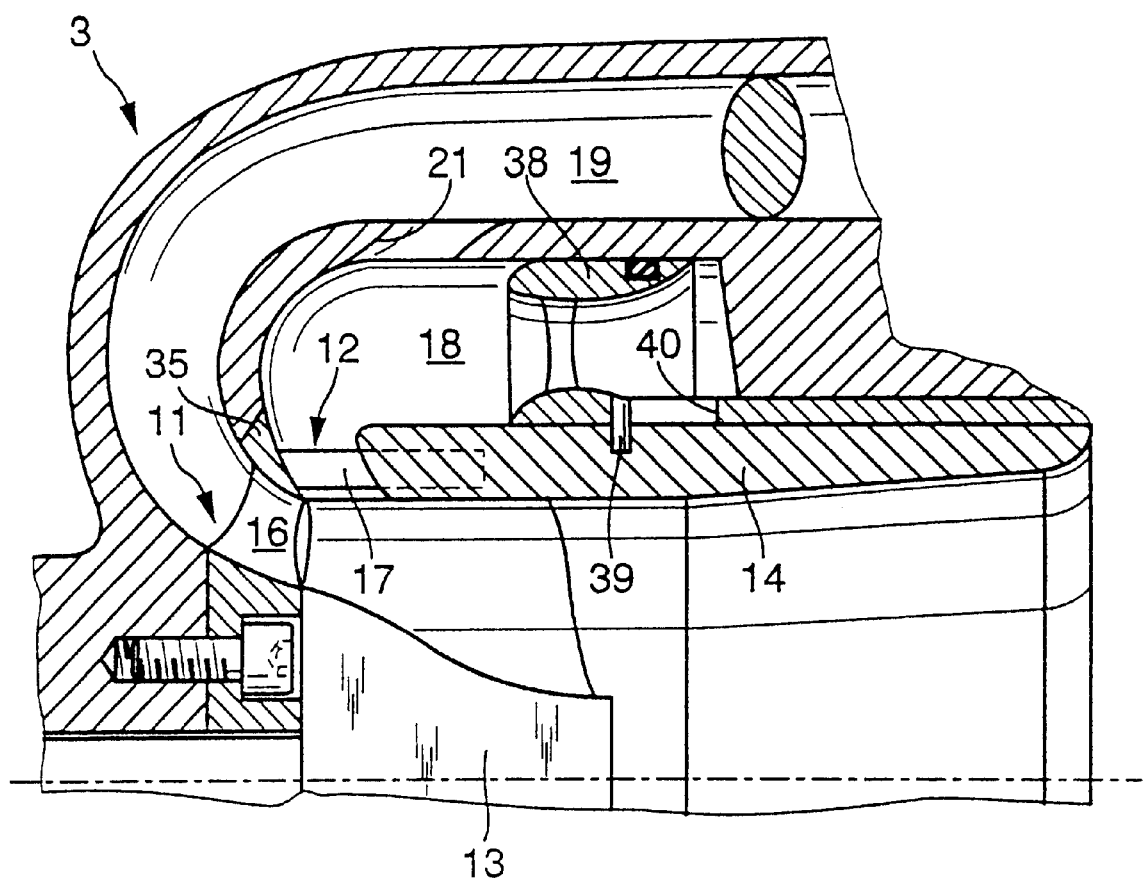
FIG. 4 shows a section through an exhaust gas turbine with a variable turbine geometry in a further embodiment.

According to the example in the embodiment shown in FIG. 4, the adjustment movement of the actuator 14 between shut-off and open positions for shutting off and exposing the radial turbine wheel entry cross-section 12 is at least partially uncoupled from the opening and the closing of the communication aperture 21 between flow passage 19 and gas-collecting chamber 18. The communication aperture 21 is to be opened and closed via an axially displaceable annular control member 38 disposed on the radially outer surface of the actuator 14 and which is displaceable relative to the actuator 14. The control member 38 is connected to the actuator 14 via an operating stop 39, which is fixed to the actuator 14 and projects into a recess 40 in the wall of the control member 38. The operating stop 39 in the recess 40 has the effect that, on an axial displacement of the control member 38 from a position closing the connecting aperture 21 to a position opening the connecting aperture 21, the actuator 14 initially remains in its shut-off position; this is equivalent to a transition from boost pressure to back pressure charging with retention of the exclusively semi-axial flow against the turbine wheel. Only when the control member 38 is displaced further in the opening direction does the operating stop 39 come into contact with a side wall of the driving recess 40, so that, in due course, the actuator 14 is also transferred from the shut-off position to the open position and the radial turbine wheel entry cross section 12 is opened.

Figure 4A:
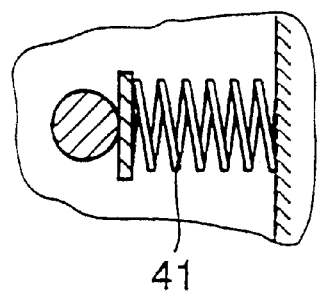
FIG. 4a shows enlarged part of the structure shown in FIG. 4.

In the sectional enlargement shown in FIG. 4a, a return spring 41 is shown which acts on the actuator in the shut-off position.

What is claimed is:

1. An exhaust gas turbocharger for an internal combustion engine, having an intake duct including a compressor, an exhaust duct including a turbine, said turbine including a turbine housing, a turbine wheel disposed in said turbine housing, said housing having at least one flow passage for an introduction of exhaust gas to said turbine and including a variable turbine geometry for controlling an effective turbine wheel inlet flow cross-section; said variable turbine geometry being adjustable between a shut-off position that minimizes the turbine wheel inlet flow area and an open position that maximizes the turbine inlet flow cross-section; a partition movably supported in said turbine housing and defining a gas-collecting chamber separated from said inlet flow area by said partition, said gas-collecting chamber having a tubular wall surrounding said partition and including communication apertures extending between a turbine inlet flow passage and said gas-collecting chamber, a total volume of said flow passage and gas-collecting chamber being adjustable by an axially movable adjusting element as a function of the operating state of the internal combustion engine by adjustment of the cross section of the communication apertures and by controlling the volume of the gas-collecting chamber.

2. The exhaust gas turbocharger according to claim 1, wherein said variable turbine geometry comprises an adjustable actuator and wherein said gas-collecting chamber is in communication with the gas inlet flow passage in at least one position of the actuator.

3. The exhaust gas turbocharger according to claim 2, wherein said actuator for said variable turbine geometry is also an adjusting element for controlling the volume of said gas-collecting chamber.

4. The exhaust gas turbocharger according to claim 2, wherein at least one wall of said gas-collecting chamber is formed by said actuator of the variable turbine geometry.

5. The exhaust gas turbocharger according to claim 1, wherein said gas-collecting chamber has a smaller volume in communication with the flow passage at lower mass flows through the turbine than at higher mass flows.

6. The exhaust gas turbocharger according to claim 1, wherein, in the shut-off position of said variable turbine geometry, the volume of the gas-collecting chamber in communication with the flow passage is less than in the open position.

7. The exhaust gas turbocharger according to claim 1, wherein said turbine has a radial turbine wheel inlet flow area and also a semi-axial turbine inlet flow area.

8. The exhaust gas turbocharger according to claim 7, wherein the gas-collecting chamber is disposed adjacent to the radial turbine wheel inlet flow area.

9. The exhaust gas turbocharger according to claim 8, wherein said actuator of said variable turbine geometry is formed as an axially displaceable annular sleeve.

10. The exhaust gas turbocharger according to claim 1, wherein said gas-collecting chamber is arranged annularly around said turbine wheel.

11. The exhaust gas turbocharger according to claim 10, wherein the flow passages are disposed in the turbine housing on the radially outward side of the gas-collecting chamber.

12. The exhaust gas turbocharger according to claim 11, wherein a partition having a variable communication aperture is provided between the gas-collecting chamber and the turbine inlet flow passages.

13. The exhaust gas turbocharger according to claim 1, wherein a plurality of separate inlet flow passages are provided and the gas-collecting chamber is in communication with each of said flow passages.

14. The exhaust gas turbocharger according to claim 13, wherein all inlet flow passages open into the semi-axial turbine wheel.

15. The exhaust gas turbocharger according to claim 1, wherein said guide vane structure is mounted on the end face of said actuator and an opening is formed in said partition in which said vane structure is received when said actuator is in the shut-off position.

16. The exhaust gas turbocharger according to claim 1, wherein said vane structure is mounted on said partition and said actuator includes an opening for receiving said vane structure when said actuator is in the shut-off position.

* * * * *